E. KEITH.
CORN HUSKING MACHINE.
APPLICATION FILED JAN. 26, 1909.

1,071,925.

Patented Sept. 2, 1913.

3 SHEETS—SHEET 1.

Witnesses:
A. G. Dimond
E. A. Volk.

Inventor:
Elgin Keith,
By Wilkely, Parker Head
Attorneys.

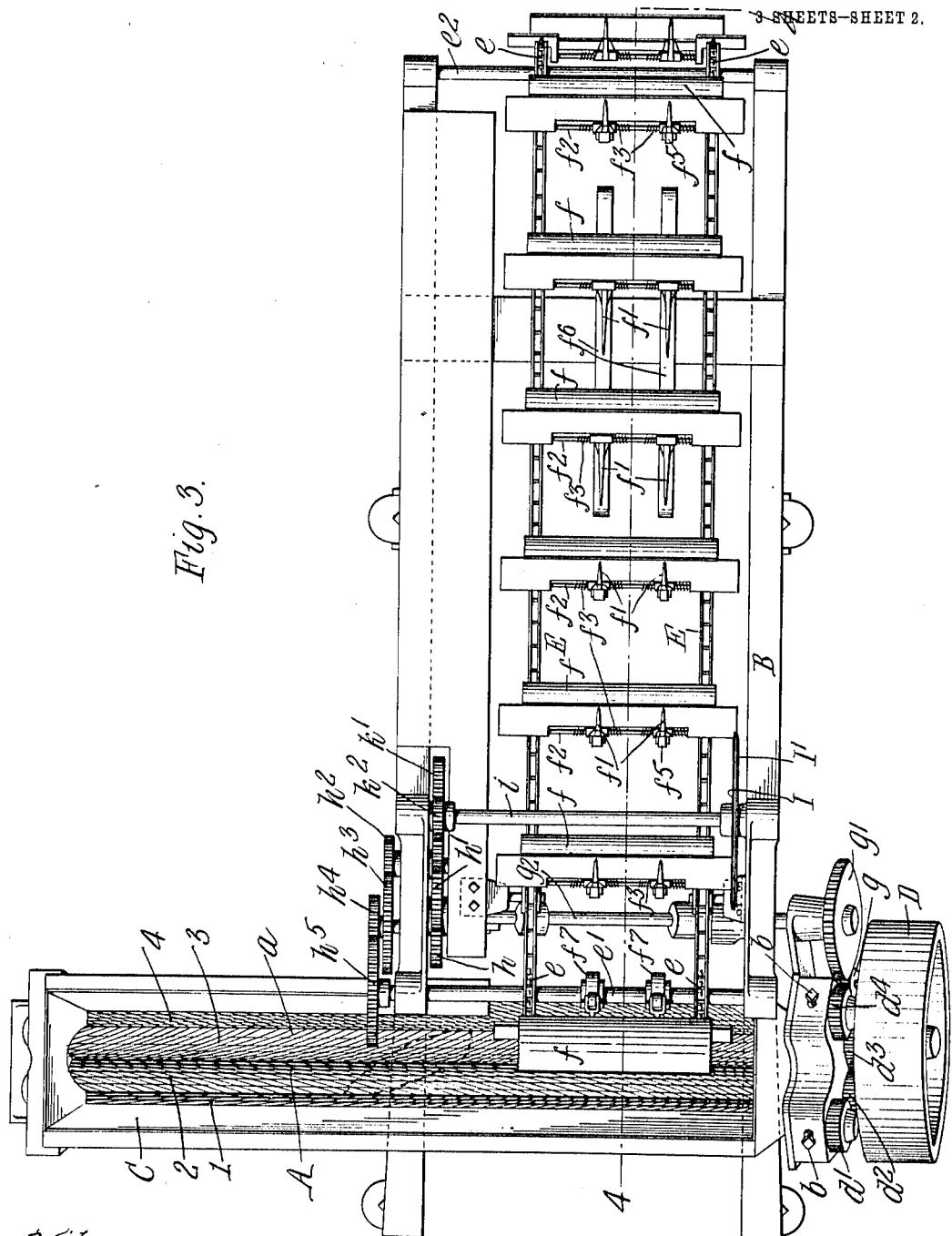

E. KEITH.
CORN HUSKING MACHINE.
APPLICATION FILED JAN. 26, 1909.
1,071,925.
Patented Sept. 2, 1913.
3 SHEETS—SHEET 3.
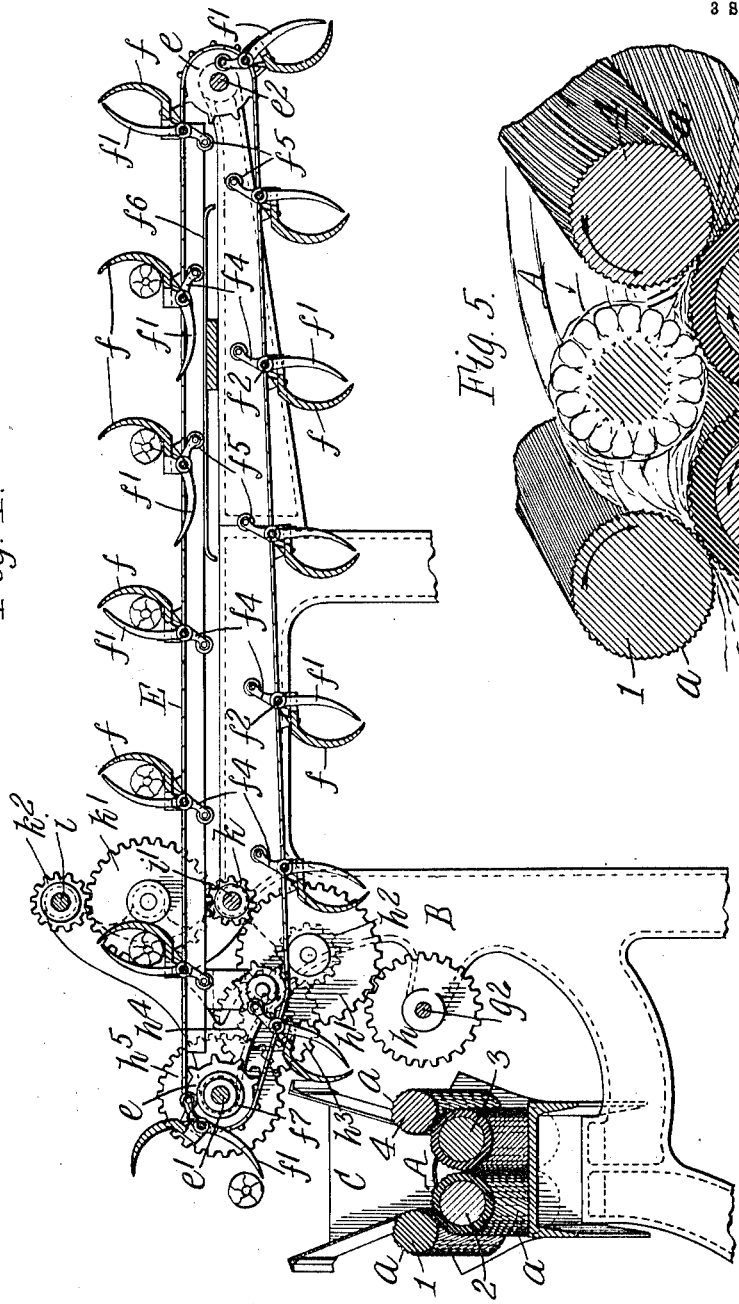
Witnesses:
A.G. Dimond.
E.A. Volk.
Inventor.
Elgin Keith,
By Wilhelm, Parker & Heird,
Attorneys.

UNITED STATES PATENT OFFICE.

ELGIN KEITH, OF SILVER CREEK, NEW YORK, ASSIGNOR TO INVINCIBLE GRAIN CLEANER COMPANY, OF SILVER CREEK, NEW YORK.

CORN-HUSKING MACHINE.

1,071,925. Specification of Letters Patent. Patented Sept. 2, 1913.

Application filed January 26, 1909. Serial No. 474,201.

*To all whom it may concern:*

Be it known that I, ELGIN KEITH, a citizen of the United States, residing at Silver Creek, in the county of Chautauqua and State of New York, have invented a new and useful Improvement in Corn-Husking Machines, of which the following is a specification.

Many machines for husking green corn have been devised, but owing to the vast difference in the size, shape and characteristics of the ears the problem has been an exceptionally difficult one to deal with, and it is believed that no machine has heretofore been produced which is capable of husking perfectly any and all ears of corn just as they run.

The object of this invention is to produce a practical, efficient and rapid green corn husking machine of simple, inexpensive construction which will thoroughly remove the husks and silk from the ears regardless of variations in the size, shape and characteristics thereof, and without bruising or breaking the kernels, and which will not readily clog or get out of order. This object is attained principally by means of the hereinafter described peculiar and novel construction, relative arrangement and proportioning of the rolls which remove the husks and silk from the ears.

Figure 1:
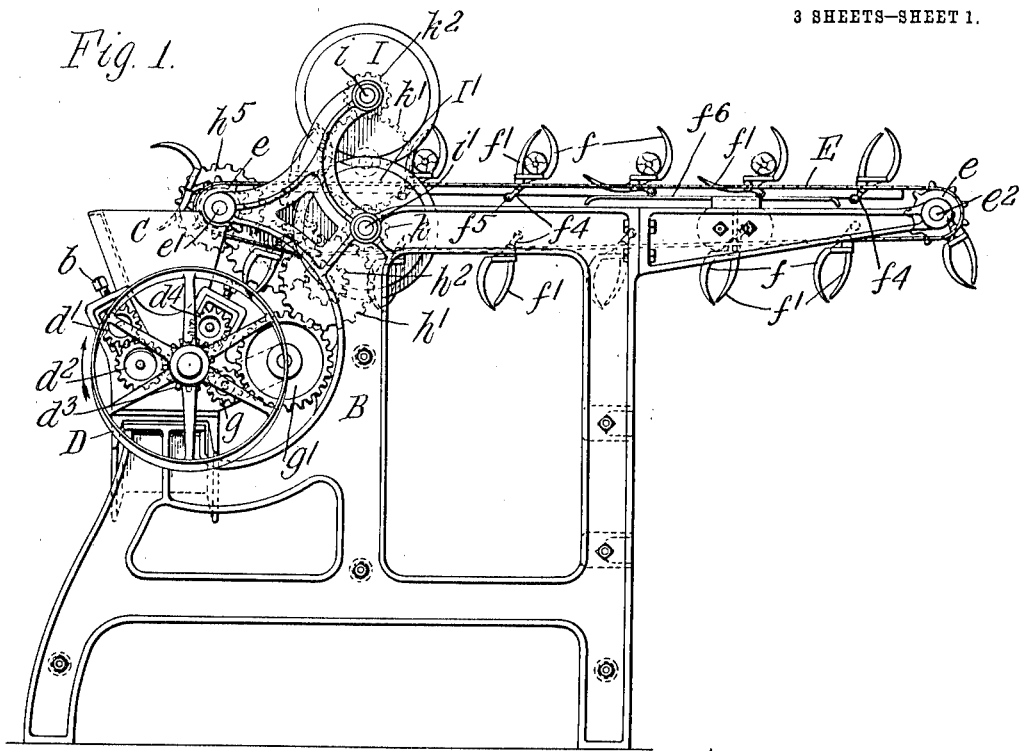
Figure 2:
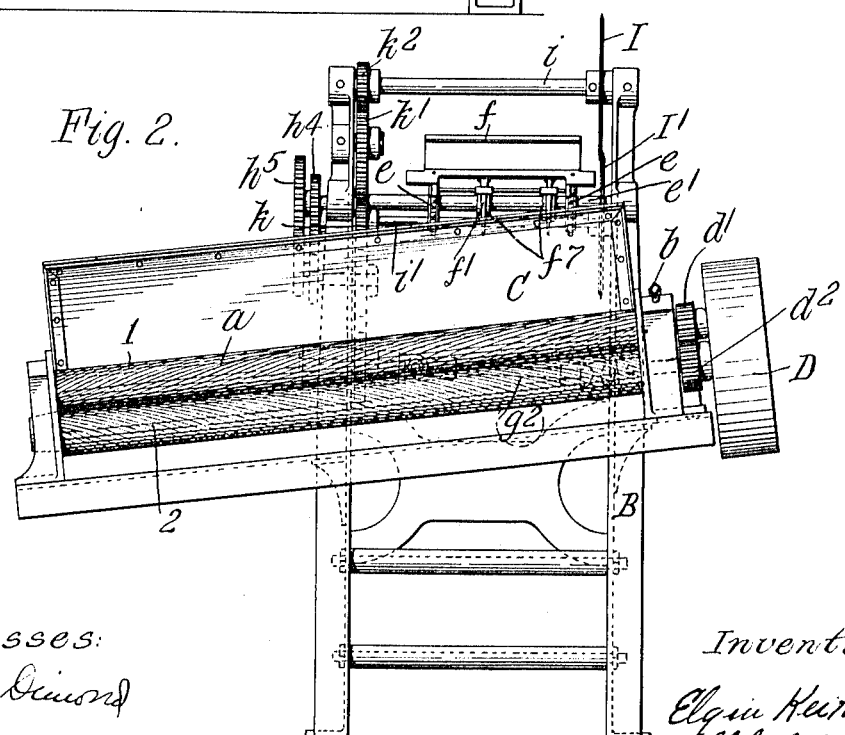

In the accompanying drawings, consisting of three sheets: Figure 1 is a side elevation of a green corn husking machine embodying the invention. Fig. 2 is a rear end elevation thereof. Fig. 3 is a plan view thereof. Fig. 4 is a longitudinal sectional elevation thereof in line 4—4, Fig. 3. Fig. 5 is an enlarged sectional perspective view of the husking and silking rolls.

Like letters of reference refer to like parts in the several figures.

1, 2, 3 and 4 represent four combined husking and silking rolls which are preferably constructed and arranged relative to each other, as best shown in Figs. 4 and 5, that is, with the rolls 2 and 3 side by side and the other rolls 1 and 4 located some distance apart and bearing respectively against the rolls 2 and 3 at the upper outer sides thereof, so that the rolls form a relatively deep valley or trough A in which the ears of corn are confined while being husked. The rolls 1 and 2 at one side of the valley A, and the rolls 3 and 4 at the other side of the valley constitute opposite husking pairs, the rolls being driven by suitable mechanism (hereinafter described) in the directions indicated by the arrows in Fig. 5, whereby the lower rolls 2 and 3 turn upwardly away from each other and tend to move the ears of corn laterally over against the upper rolls so that the opposite husking pairs 1, 2 and 3, 4 tend to grasp the husks and tear them from the ears, feeding the husks outwardly between the rolls of the husking pairs.

The rolls are preferably arranged at an inclination so that the action of gravity causes the ears of corn, which are fed into the upper end of the valley between the rolls, to travel endwise through said valley, and the rolls are also preferably provided with surface corrugations or grooves $a$ which extend helically around the rolls in directions shown, such that they supplement the action of gravity in moving the ears lengthwise of the rolls.

The husking rolls are journaled at their ends in bearings on a suitable frame B, the journal boxes for the upper rolls 1 and 4 being shown as adjustable by means of screws $b$ to secure the proper pressure of the upper rolls on the lower ones. A box or trough C is supported on the frame over the rolls to confine the ears of corn in the valley A between the opposite pairs of husking rolls.

Any suitable mechanism may be employed for driving the rolls in the directions above stated. In the construction shown in the drawings, the journals at the upper ends of the husking rolls are extended beyond their bearings and provided with intermeshing gear wheels $d'$, $d^2$, $d^3$, $d^4$, Figs. 1 and 3, and a pulley D for a driving belt is secured to the outer end of the journal of one of the rolls, for instance, the lower roll 3.

The ears of corn are dropped or fed one after another into the box or trough near the upper end thereof so that they will fall sidewise into the valley A between the opposite pairs of rolls. The action of the husking rolls is entirely independent of the means for feeding the ears of corn to the rolls and the ears may be fed to the rolls in the manner stated by any suitable mechanism, or even by hand.

The relative size and arrangement of the husking rolls should be such that the width of the space between the upper rolls 1 and 4 will be greater than the diameter of large ears of corn, thus enabling the ears to assume a more or less oblique position between these rolls in their passage through the valley A, and the rolls should also be disposed to form rather abrupt sides for the valley so that the ears cannot be readily thrown out of the valley. In the operation of the machine the lower rolls 2 and 3, on which the ears rest, cause the ears to roll or turn axially, and they also tend to lift and swing the ears from side to side so as to throw one end portion of the ears into the bite of one or the other of the opposite pairs of husking rolls and cause the husks to be gripped by such rolls and torn from the ears. The rolls are much longer than the ears of corn, being preferably about three feet long, and the husks will be grasped and torn from each ear before it can pass off of the tail end of the rolls. Owing to the swinging or throwing of the ear from side to side if one pair of rolls fails to strip the husks from an ear, the other pair will do so, and if one pair of rolls at first only tears a portion of the husks from an ear the remaining husks will be grasped and torn off later by one or the other pair of rolls before the ear escapes. The action of the rolls is therefore very certain and reliable. The rolls also remove the silk from the ears. The rolls are kept wet, as usual, by a stream of water (not shown) which is directed thereon.

In the construction illustrated in the drawings rubber-covered lower rolls 2 and 3 somewhat larger in diameter than the largest ears of corn are employed, and metal upper rolls 1 and 4 which are about the same or somewhat smaller in diameter than ordinary ears of corn, the upper and lower rolls being driven at the same surface speed, and all the rolls having shallow helical surface corrugations or ribs which are narrow and closely spaced and which have a greater pitch on the small upper rolls than on the lower rolls. The corners of the corrugations or ribs are not sharp enough to cut or break the kernels of the corn. Owing to the different pitch of the ribs or corrugations on the upper and lower rollers of each husking pair, the ribs draw across each other with a sort of shearing action which tends to cut or break the husks away from the ears, and decreases the tendency to draw the ears in between the rolls. Good results have, however, also been obtained by using rubber-covered upper rolls of the same size as the metal upper rolls 1 and 4 described. With one metal and one rubber surfaced roll in each pair there is less friction between the rolls and husks than when both rolls have rubber surfaces, and there is less give between the rolls, thus lessening the possibility of the ears being drawn in between the rolls and being crushed or clogging the machine. The rolls constructed and arranged as described completely remove the husks and silk from the ears almost without exception, regardless of the shape and size of the ears and the nature of their husks. If occasionally an ear should pass out of the machine without being husked, it can be readily thrown back into the trough by the attendant and husked, as the trough is open and there are no parts to prevent the ear from being thus thrown back into the same.

An endless conveyer is shown in the drawings for feeding the ears to the husking rolls which extends horizontally at right angles to the husking rolls and comprises chains E which pass around sprocket wheels $e$ on horizonal shafts $e'$ $e^2$ journaled on the main frame B and are connected by transverse holders for the ears of corn. Each holder consists of a transverse relatively stationary jaw $f$ attached to the chains E and projecting upwardly or outwardly therefrom, and two jaws $f'$ which are independently pivoted on a rod $f^2$ mounted on the stationary jaw, toward which their outer ends are pressed by springs $f^3$ coiled about said pivot rod. The movable jaws $f'$ have inwardly projecting arms $f^4$ provided at their ends with anti-friction rollers $f^5$. During the travel of the ear holders toward the husking rolls with the upper run of the conveyer, these rollers engage horizontal rails $f^6$ secured on the frame beneath the upper run of the conveyer, which swings the pivoted jaws to open the holders. Ears of corn are placed successively by hand in the holders while they are held open by the rails $f^6$, and when the rollers $f^5$ clear the rear ends of the rails the holders are closed by their springs and firmly grip and hold the ears until, as the holders pass around the shaft $e'$ over the trough, the rollers $f^5$ engage disks $f^7$ on said shaft which again open the holders and allow the ears to fall into the trough. The jaws $f'$ being independently pivoted and operated by separate springs, both jaws will firmly grip the ear regardless of the shape thereof.

The feed conveyer is driven as follows: The gear pinion $d^3$ on the journal of the husking roll 3 is connected by gear wheels $g$, $g'$, Fig. 1, with a flexibly jointed transverse shaft $g^2$, and this shaft is geared by wheels $h$, $h'$, $h^2$, $h^3$, $h^4$, $h^5$, Figs. 3 and 4, with the conveyer shaft $e$. As before stated, a feed conveyer of any suitable sort could be used.

I I' represent coöperating rotary knives at one side of the feed conveyer, past which the ears of corn are carried while firmly held in the ear holders, for cutting off the stalks or butt ends of the ears. These knives are secured to shafts $i$ $i'$ which are driven from the gear wheel $h'$, by intermeshing gears $k$, $k'$ and $k^2$, Fig. 4. Butt cutters are preferably used as they rid the ears of the stalks and sever the husks at the butt ends of the ears, thereby facilitating the operation of the husking rolls, but the removal of the stalks is not essential to the action of the husking rolls and good results are secured without the butt cutters.

I claim as my invention:

1. In a green corn husking machine, the combination of a plurality of pairs of rolls forming together a husking trough, each of said pairs consisting of an upper and a lower roll, the lower rolls of said pairs forming the bottom of said trough and the upper rolls forming portions of the side walls of said trough, and being spaced apart far enough to allow an ear of corn to swing obliquely between the same, and means for positively rotating said lower rolls upwardly and outwardly in opposite directions toward the upper rolls, and said upper rolls downwardly and inwardly toward the lower rolls, said lower rolls being provided with continuous substantially rigid green corn husking surfaces formed to move the ears of corn obliquely across the trough and against the upper rolls, and said upper rolls being provided with husk grasping surfaces formed to coöperate with the lower rolls both to grasp and to feed the husks between the said pairs of upper and lower rolls.

2. In a green corn husking machine, the combination of a plurality of pairs of husking rolls forming together a husking trough, each of said pairs consisting of an upper and a lower roll, the lower rolls of said pairs forming the bottom of said trough and the upper rolls forming portions of the side walls of said trough and being spaced apart far enough to allow the ears of corn to swing obliquely between the same, and means for positively rotating said lower rolls upwardly and outwardly in opposite directions toward the upper rolls, and the upper rolls downwardly and inwardly toward the lower rolls, said lower rolls being provided with continuous substantially rigid green corn husking surfaces having shallow helical corrugations which wind on the rolls respectively in directions opposite to the directions of rotation of the rolls and move the ears of corn obliquely in the trough against the upper rolls and propel the ears lengthwise in the trough, and the upper rolls being provided with husk-grasping surfaces formed to coöperate with the lower rolls both to grasp and to feed the husks between said pairs of upper and lower rolls, the ears of corn being unconfined and free to shift and swing laterally in said trough between said upper rolls, substantially as set forth.

3. In a green corn husking machine, the combination of two oppositely disposed pairs of husking rolls forming together a husking trough, the lower rolls of said pairs forming the bottom of said trough, and the upper rolls forming portions of the side walls of said trough, said upper rolls being of smaller diameter than said lower rolls and being spaced apart far enough to allow the ears of corn to swing obliquely between the same, and means for positively rotating said lower rolls upwardly and outwardly in opposite directions toward the upper rolls, and the upper rolls downwardly and inwardly toward the lower rolls, said lower rolls being provided with continuous substantially rigid green corn husking surfaces having shallow helical corrugations of relatively great pitch which wind on the rolls respectively in directions opposite to the directions of rotation of the rolls and move the ears of corn obliquely in the trough against the upper rolls and propel the ears lengthwise in the trough, and the upper rolls having metal surfaces with shallow corrugations which coöperate with the lower rolls both to grasp and to feed the husks between said pairs of upper and lower rolls, the ears of corn being unconfined and free to shift and swing laterally in said trough between said upper rolls, substantially as set forth.

4. In a corn husking machine, the combination of corn husking rolls, and means for rotating said rolls in opposite directions, said rolls having helical surface corrugations which have a greater pitch on one roll than on the other, substantially as set forth.

5. In a corn husking machine, the combination of corn husking rolls, and means for rotating said rolls in opposite directions; said rolls being of different diameters and having helical surface corrugations, the corrugations on the smaller roll having a greater pitch than those on the larger roll, substantially as set forth.

6. In a corn husking machine, the combination of a lower and an upper husking roll, means opposite said rolls and forming therewith an intervening valley to receive the ears of corn, which valley is relatively deep and wide whereby the ears are confined therein but are free to swing laterally, and means for rotating said rolls in opposite directions, said rolls having helical surface corrugations of different pitch, substantially as set forth.

Witness my hand, this 21st day of January, 1909.

ELGIN KEITH.

Witnesses:
C. W. PARKER,
C. B. HORNBECK.